(12) United States Patent
Watanabe (10) Patent No.: US 11,389,700 B2
(45) Date of Patent: Jul. 19, 2022

(54) GOLF BALL

(71) Applicant: Bridgestone Sports Co., Ltd., Tokyo (JP)

(72) Inventor: Hideo Watanabe, Saitamaken (JP)

(73) Assignee: Bridgestone Sports Co., Ltd., Tokyo (JP)

(*) Notice: Subject to any disclaimer, the term of this patent is extended or adjusted under 35 U.S.C. 154(b) by 0 days.

(21) Appl. No.: 17/156,733

(22) Filed: Jan. 25, 2021

(65) Prior Publication Data

US 2021/0236884 A1     Aug. 5, 2021

(30) Foreign Application Priority Data

Feb. 4, 2020    (JP) .............................. JP2020-017043

(51) Int. Cl.

| | |
|---|---|
| A63B 37/06 | (2006.01) |
| A63B 37/00 | (2006.01) |
| C08L 23/22 | (2006.01) |
| C08K 5/053 | (2006.01) |
| A63B 102/32 | (2015.01) |
| C08K 5/09 | (2006.01) |

(52) U.S. Cl.
CPC ...... *A63B 37/0031* (2013.01); *A63B 37/0051* (2013.01); *A63B 37/0075* (2013.01); *C08L 23/22* (2013.01); *A63B 2102/32* (2015.10); *C08K 5/053* (2013.01); *C08K 5/09* (2013.01)

(58) Field of Classification Search
CPC ............ A63B 37/0063; A63B 37/0062; A63B 37/0081

USPC .................................................. 473/376, 378
See application file for complete search history.

(56) References Cited

U.S. PATENT DOCUMENTS

| | | | |
|---|---|---|---|
| 5,743,814 A | 4/1998 | Endo | |
| 2001/0016522 A1 | 8/2001 | Watanabe et al. | |
| 2005/0164809 A1 | 7/2005 | Watanabe et al. | |
| 2005/0170910 A1 | 8/2005 | Hayashi | |
| 2007/0281800 A1 | 12/2007 | Makino et al. | |
| 2008/0220900 A1 | 9/2008 | Komatsu | |
| 2009/0209366 A1 | 8/2009 | Kasashima et al. | |
| 2011/0224024 A1* | 9/2011 | Tutmark ............ | A63B 37/0022 473/378 |
| 2017/0368419 A1* | 12/2017 | Nakajima .......... | A63B 37/0063 |

FOREIGN PATENT DOCUMENTS

| | | |
|---|---|---|
| JP | 08-280845 A | 10/1996 |
| JP | 2001-218875 A | 8/2001 |
| JP | 2005-211656 A | 8/2005 |

(Continued)

*Primary Examiner* — Raeann Gorden
(74) *Attorney, Agent, or Firm* — Sughrue Mion, PLLC (57) ABSTRACT

A golf ball for amateur golfers has both an excellent flight and a good, soft feel when hit by the average golfer whose head speed is not very high. The ball has a compressive deformation B when subjected to a final load of 50 kgf from an initial load of 5 kgf that is from 1.30 to 1.80 mm and a compressive deformation C when subjected to a final load of 90 kgf from an initial load of 5 kgf that is from 2.45 to 2.90 mm. The core of the ball has a hardness profile which satisfies the conditions (1) Cs−Cc≥20 and (2) Cs−Cs−3≤5.0, wherein Cs is the Shore C hardness at the core surface, Cs−3 is the Shore C hardness 3 mm inside the core and Cc is the Shore C hardness at the core center.

12 Claims, 2 Drawing Sheets

(56) References Cited

FOREIGN PATENT DOCUMENTS

| | | |
|---|---|---|
| JP | 2005-218858 A | 8/2005 |
| JP | 2007-319666 A | 12/2007 |
| JP | 2008-212682 A | 9/2008 |
| JP | 2009-195670 A | 9/2009 |

* cited by examiner

GOLF BALL

CROSS-REFERENCE TO RELATED APPLICATION

This non-provisional application claims priority under 35 U.S.C. § 119(a) on Patent Application No. 2020-017043 filed in Japan on Feb. 4, 2020, the entire contents of which are hereby incorporated by reference.

TECHNICAL FIELD

The present invention relates to a golf ball which has at least a core and a cover and is intended for use by amateur golfers lacking a fast head speed.

BACKGROUND ART

Numerous golf balls intended to satisfy the amateur golfer in terms of flight performance and feel at impact have hitherto been developed in the golf ball market for amateur golfers. For example, JP-A H8-280845 describes a golf ball in which the amount of compressive deformation by the ball when subjected to a final load of 5 kgf from an initial load state of 0.2 kgf is used as an indicator of the effects on the ball properties when a small impact force acts upon the ball, this value being set in the range of from 0.26 to 0.40 mm. However, this golf ball is a spin-type ball that is targeted primarily at the spin rate on approach shots and does not fully satisfy the flight performance desired on shots with a driver.

In addition, a variety of functional, multi-piece solid golf balls in which the ball has a multilayer construction and the surface hardnesses of the respective layers—i.e., the core, intermediate layer and cover (outermost layer)—are optimized have been described. These include the multi-piece solid golf balls disclosed in JP-A 2005-211656, JP-A 2007-319666, JP-A 2001-218875, JP-A 2005-218858, JP-A 2008-212682 and JP-A 2009-195670. The golf balls disclosed in these patent publications are three-piece solid golf balls in which a material softer than the cover is used in the intermediate layer, and which provide an excellent flight performance even when used by amateur golfers lacking a fast head speed. However, these prior-art golf balls do not optimize, for example, the amount of compressive deformation when the ball is subjected to a final load of 50 kgf from an initial load state of 5 kgf and the amount of compressive deformation when the ball is subjected to a final load of 90 kgf from an initial load state of 5 kgf. That is, no attention has been paid to how the golf ball properties are affected by the magnitude of the impact forces acting on the ball, and so there remains room for improvement in obtaining a good flight performance and a good feel at impact in golf ball products for the amateur golfer.

SUMMARY OF THE INVENTION

It is therefore an object of the present invention to provide a golf ball for amateur golfers which has an excellent flight when hit by the average golfer whose head speed is not very high and which also has a good, soft feel at impact.

As a result of extensive investigations, we have focused on the relationship, in golf balls having a core and a cover, between the magnitude of the impact forces applied to the golf ball and the ball characteristics of flight and feel. We have discovered in particular that by specifying, in the amount of compressive deformation by the golf ball, the compressive deformation B when the ball is subjected to a final load of 50 kgf from an initial load state of 5 kgf and the compressive deformation C when the ball is subjected to a final load of 90 kgf from an initial load state of 5 kgf, and by also specifying the relationships between the Shore C hardnesses at the core center, the core surface and a position 3 mm inside the core surface, a ball can be obtained that enables golfers lacking a high head speed to achieve a satisfactory flight performance on full shots with a driver (W #1) or an iron, that has a good, soft feel at impact, and that moreover has a good durability to cracking.

Accordingly, the invention provides a golf ball having a core and a cover, wherein the ball has a compressive deformation B when subjected to a final load of 50 kgf from an initial load state of 5 kgf that is from 1.30 to 1.80 mm and a compressive deformation C when subjected to a final load of 90 kgf from an initial load state of 5 kgf that is from 2.45 to 2.90 mm, and the core has a hardness profile that satisfies the following conditions:

$$Cs - Cc \geq 20 \quad (1)$$

$$Cs - Cs{-}3 \leq 5.0, \quad (2)$$

wherein Cs is the Shore C hardness at a surface of the core, Cs−3 is the Shore C hardness at a position 3 mm inside the core surface and Cc is the Shore C hardness at a center of the core.

In a preferred embodiment of the golf ball of the invention, the compressive deformation A of the ball when subjected to a final load of 5 kgf from an initial load state of 0.2 kgf is 0.18 mm or less.

In another preferred embodiment of the inventive golf ball, the compressive deformation D of the ball when subjected to a final load of 130 kgf from an initial load state of 10 kgf is from 3.10 to 3.80 mm.

In yet another preferred embodiment, the compressive deformation E of the ball when subjected to a final load of 30 kgf from an initial load state of 5 kgf is from 0.68 to 1.05 mm.

In still another preferred embodiment, the ratio D/A between compressive deformation D and compressive deformation A is at least 18.0.

In a further preferred embodiment, the ratio DB between compressive deformation D and compressive deformation B is from 2.02 to 2.40.

In a still further preferred embodiment, the ratio D/C between compressive deformation D and compressive deformation C is from 1.20 to 1.31.

In a yet further preferred embodiment, the ratio D/E between compressive deformation D and compressive deformation E is from 3.50 to 4.10.

In another preferred embodiment, the core of the inventive golf ball is formed of a rubber composition containing (a) a base rubber, (b) a co-crosslinking agent which is an α,β-unsaturated carboxylic acid and/or a metal salt thereof, (c) a crosslinking initiator, and (d) a lower alcohol having a molecular weight below 200. In this preferred embodiment, component (d) is included in an amount that may be from 0.5 to 5 parts by weight per 100 parts by weight of the base rubber (a). Component (d) may be a monohydric, dihydric or trihydric alcohol. In particular, component (d) may be butanol, glycerol, ethylene glycol or propylene glycol.

In still another preferred embodiment, the golf ball further includes, between the core and the cover, at least an envelope layer and an intermediate layer, and has a construction of three or more layers that includes the core, the intermediate layer and the cover.

Advantageous Effects of the Invention

The golf ball of the invention has an excellent flight performance when hit by golfers whose head speeds are not that high, a good, soft feel at impact, and moreover a good durability to cracking, making it highly suitable for use by amateur golfers.

BRIEF DESCRIPTION OF THE DIAGRAMS

DESCRIPTION OF THE PREFERRED EMBODIMENTS

The objects, features and advantages of the invention will become more apparent from the following detailed description taken in conjunction with the appended diagrams.

The golf ball of the invention has a core and a cover. In this invention, the cover refers to the member situated as, aside from a coating layer, the outermost layer in the ball construction and is typically formed by injection molding or the like. Numerous dimples are typically formed on the outer surface of the cover at the same time that the cover material is injection molded.

The core has a diameter of preferably at least 36.0 mm, more preferably at least 36.5 mm, and even more preferably at least 37.0 mm. The upper limit is preferably not more than 39.0 mm, more preferably not more than 38.5 mm, and even more preferably not more than 38.0 mm. When the core diameter is too small, the spin rate on shots with a driver (W#1) may become high, as a result of which it may not be possible to achieve the desired distance. On the other hand, when the core diameter is too large, the durability to repeated impact may worsen or the feel at impact may worsen.

The core has an amount of compressive deformation 0 (mm) when subjected to a final load of 1,275 N (130 kgf) from an initial load of 98 N (10 kgf) which, although not particularly limited, is preferably at least 3.5 mm, more preferably at least 3.8 mm, and even more preferably at least 4.2 mm. The upper limit is preferably not more than 6.0 mm, more preferably not more than 5.3 mm, and even more preferably not more than 4.8 mm. When the compressive deformation of the core is too small, i.e., when the core is too hard, the spin rate of the ball may rise excessively and a good distance may not be achieved, or the feel at impact may be too hard. On the other hand, when the compressive deformation of the core is too large, i.e., when the core is too soft, the rebound may become too low and a good distance may not be achieved, the feel at impact may be too soft, or the durability to cracking on repeated impact may worsen.

The core is formed of a single layer or a plurality of layers of rubber material. A rubber composition can be prepared as this core-forming rubber material by using a base rubber as the chief component and including, together with this, other ingredients such as a co-crosslinking agent, an organic peroxide, an inert filler and an organosulfur compound. In particular, it is preferable in this invention to form the core of a rubber composition which includes at least components (a) to (d) below:

(a) a base rubber,
(b) a co-crosslinking agent which is an $\alpha,\beta$-unsaturated carboxylic acid and/or a metal salt thereof,
(c) a crosslinking initiator, and
(d) a lower alcohol having a molecular weight below 200.

It is preferable to use a polybutadiene as the base rubber serving as component (a). Commercial products may be used as the polybutadiene. Illustrative examples include BR01, BR51 and BR730 (all products of JSR Corporation). The proportion of polybutadiene within the base rubber is preferably at least 60 wt %, and more preferably at least 80 wt %. Rubber ingredients other than the above polybutadienes may be included in the base rubber, provided that doing so does not detract from the advantageous effects of the invention. Examples of rubber ingredients other than the above polybutadienes include other polybutadienes and also other diene rubbers, such as styrene-butadiene rubbers, natural rubbers, isoprene rubbers and ethylene-propylene-diene rubbers.

The co-crosslinking agent serving as component (b) is an $\alpha,\beta$-unsaturated carboxylic acid and/or a metal salt thereof. Specific examples of unsaturated carboxylic acids include acrylic acid, methacrylic acid, maleic acid and fumaric acid. The use of acrylic acid or methacrylic acid is especially preferred. Metal salts of unsaturated carboxylic acids are exemplified by the above unsaturated carboxylic acids that have been neutralized with desired metal ions. Specific examples include the zinc salts and magnesium salts of methacrylic acid and acrylic acid. The use of zinc acrylate is especially preferred. These unsaturated carboxylic acids and/or metal salts thereof are included in an amount, per 100 parts by weight of the base rubber, which is preferably at least 10 parts by weight, more preferably at least 15 parts by weight, and even more preferably at least 20 parts by weight. The upper limit is preferably not more than 45 parts by weight, more preferably not more than 43 parts by weight, and even more preferably not more than 41 parts by weight.

It is suitable to use an organic peroxide as the crosslinking initiator serving as component (c). Specifically, it is suitable to use an organic peroxide having a relatively high thermal decomposition temperature. Organic peroxides having a high one-minute half-life temperature of between about 165° C. and about 185° C., such as dialkyl peroxides, may be used. Examples of dialkyl peroxides that may be suitably used include dicumyl peroxide (Percumyl D, from NOF Corporation), 2,5-dimethyl-2,5-di(t-butylperoxy)hexane (Perhexa 25B, from NOF Corporation) and di(2-t-butylperoxyisopropyl)benzene (Perbutyl P, from NOF Corporation). Preferred use can be made of dicumyl peroxide. These may be used singly or two or more may be used together. The half-life is one indicator representing the magnitude of the decomposition rate by the organic peroxide, and is expressed as the time required for the original organic peroxide to decompose and the amount of active oxygen therein to fall to one-half. The vulcanization temperature in the core-forming rubber composition is generally in a range of between 120° C. and 190° C.; within this range, an organic peroxide having a high one-minute half-life temperature of between about 165° C. and about 185° C. undergoes relatively slow thermal decomposition. Using the rubber composition of this invention, the core—a crosslinked rubber product having a specific internal hardness profile—is obtained by adjusting the amount of free radical generation, which increases as the vulcanization time elapses.

The crosslink initiator is included in an amount, per 100 parts by weight of the base rubber, which is preferably at least 0.1 part by weight, more preferably at least 0.2 part by weight, and even more preferably at least 0.3 part by weight. The upper limit is preferably not more than 5.0 parts by weight, more preferably not more than 4.0 parts by weight, even more preferably not more than 3.0 parts by weight, and most preferably not more than 2.0 parts by weight. When too much is included, the golf ball may become too hard and have an unpleasant feel on impact, in addition to which the durability to cracking may also greatly decrease. Conversely, when too little is included, the ball may become too soft and have an unpleasant feel at impact, in addition to which the productivity may greatly decrease.

Component (d) is a lower alcohol having a molecular weight of less than 200. As used herein, "alcohol" refers to a substance having one or more alcoholic hydroxyl group; the term "alcohol" here also encompasses substances obtained by the polycondensation of polyhydric alcohols having two or more hydroxyl groups. In addition, "lower alcohol" refers to an alcohol having a small number of carbon atoms; that is, an alcohol having a small molecular weight. By including this lower alcohol in the rubber composition, when the rubber composition is vulcanized (cured), a cured rubber product (core) having the desired core hardness profile can be obtained and the spin rate of the ball when struck can be sufficiently lowered, enabling the ball to be endowed with an excellent flight performance.

It is especially desirable for the lower alcohol to be a monohydric, dihydric or trihydric alcohol (an alcohol having one, two or three alcoholic hydroxyl groups). Specific examples include, but are not limited to, methanol, ethanol, propanol, butanol, ethylene glycol, diethylene glycol, propylene glycol, dipropylene glycol, tripropylene glycol and glycerol. These have molecular weights of less than 200, preferably less than 150, and more preferably less than 100. When the molecular weight is too large, i.e., when the number of carbon atoms is too high, the desired core hardness profile cannot be obtained and fully achieving a lower spin rate by the ball on shots becomes impossible.

Component (d) is included in an amount, per 100 parts by weight of the base rubber, which is preferably at least 0.1 part by weight, and more preferably at least 0.5 part by weight. The upper limit is preferably not more than 10 parts by weight, more preferably not more than 6 parts by weight, and even more preferably not more than 3 parts by weight. When too much component (d) is included, the hardness decreases and the desired feel, durability and rebound may not be obtained. When too little is included, the desired core hardness profile may not be obtained and it may be impossible to fully achieve a lower spin rate by the ball on shots.

In addition to above components (a) to (d), various other additives such as fillers, antioxidants and organosulfur compounds may also be included, so long as doing so does not detract from the advantageous effects of the invention.

Fillers that may be suitably used include zinc oxide, barium sulfate and calcium carbonate. One of these may be used alone, or two or more may be used together. The amount of filler included per 100 parts by weight of the base rubber may be set to preferably at least 1 part by weight, and more preferably at least 3 parts by weight. The upper limit in the amount included per 100 parts by weight of the base rubber is preferably not more than 200 parts by weight, more preferably not more than 150 parts by weight, and even more preferably not more than 100 parts by weight. Too much or too little inert filler may make it impossible to obtain a proper ball weight and a suitable rebound.

Antioxidants that may be used include commercial antioxidants such as Nocrac NS-6, Nocrac NS-30, Nocrac 200 and Nocrac MB (all available from Ouchi Shinko Chemical Industry Co., Ltd.). One of these may be used alone, or two or more may be used together.

The amount of antioxidant included per 100 parts by weight of the base rubber, although not particularly limited, is preferably at least 0.05 part by weight, and more preferably at least 0.1 part by weight. The upper limit is preferably not more than 1.0 part by weight, more preferably not more than 0.7 part by weight, and even more preferably not more than 0.5 part by weight. Too much or too little antioxidant may make it impossible to achieve a suitable core hardness gradient, a good rebound, a good durability and a good spin rate lowering effect on full shots.

In addition, an organosulfur compound may be included in the rubber composition in order to impart a good resilience. Organosulfur compounds recommended for this purpose are thiophenols, thionaphthols, halogenated thiophenols and metal salts of these. Specific examples include pentachlorothiophenol, pentafluorothiophenol, pentabromothiophenol and p-chlorothiophenol as well as the zinc salts of these, and also any of the following having from two to four sulfur atoms: diphenylpolysulfides, dibenzylpolysulfides, dibenzoylpolysulfides, dibenzothiazoyl polysulfides and dithiobenzoylpolysulfides. The use of diphenyldisulfide or the zinc salt of pentachlorothiophenol is especially preferred.

The amount of organosulfur compound included per 100 parts by weight of the base rubber is at least 0.05 part by weight, preferably at least 0.07 part by weight, and more preferably at least 0.1 part by weight. The upper limit is preferably not more than 5 parts by weight, more preferably not more than 4 parts by weight, even more preferably not more than 3 parts by weight, and most preferably not more than 2 parts by weight. When too much organosulfur compound is included, the hardness becomes too low; including too little makes an improvement in the rebound unlikely.

The core can be produced by vulcanizing and curing the rubber composition containing the above ingredients. For example, the core can be produced by using a Banbury mixer, roll mill or other mixing apparatus to intensively mix the rubber composition, subsequently compression molding or injection molding the mixture in a core mold, and curing the resulting molded body by suitably heating it under conditions sufficient to allow the organic peroxide or co-crosslinking agent to act, such as at a temperature of between 100 and 200° C., preferably between 140 and 180° C., for 10 to 40 minutes. The core may consist of a single layer alone, or may be formed as a two-layer core consisting of an inner core layer and an outer core layer. When the core is formed as a two-layer core consisting of an inner core layer and an outer core layer, the inner core layer and outer core layer materials may each be composed primarily of the above-described rubber material. The rubber material making up the outer core layer encasing the inner core layer may be the same as or different from the inner core layer material. The details here are the same as those given above for the ingredients of the core-forming rubber material.

Next, the core hardness profile is described.

The core center has a hardness (Cc) which, expressed on the Shore C hardness scale, is preferably at least 47, more preferably at least 49, and even more preferably at least 51. The upper limit is preferably not more than 60, more preferably not more than 57, and even more preferably not more than 55. When this value is too large, the feel at impact may become hard, or the spin rate on full shots may rise, as a result of which the intended distance may not be achieved. On the other hand, when this value is too small, the rebound may become low, resulting in a poor distance, or the durability to cracking on repeated impact may worsen. The Shore C hardness is the hardness value measured with a Shore C durometer in accordance with ASTM D2240.

The core center hardness (Cc) expressed on the Shore D hardness scale is preferably at least 24, more preferably at least 26, and even more preferably at least 28. The upper limit is preferably not more than 36, more preferably not more than 34, and even more preferably not more than 32.

The core surface has a hardness (Cs) which, expressed on the Shore C hardness scale, is preferably at least 68, more preferably at least 70, and even more preferably at least 72. The upper limit is preferably not more than 83, more preferably not more than 80, and even more preferably not more than 77. A value outside of this range may lead to undesirable results similar to those described above for the core center hardness (Cc).

The core surface hardness (Cs) on the Shore D hardness scale is preferably at least 37, more preferably at least 38, and even more preferably at least 40. The upper limit is preferably not more than 48, more preferably not more than 46, and even more preferably not more than 44.

The difference Cs−Cc between the core surface hardness (Cs) and the core center hardness (Cc), expressed on the Shore C hardness scale, must be at least 20, and is preferably at least 21. The upper limit is preferably not more than 30, more preferably not more than 25, and even more preferably not more than 23. When this value is too small, the ball spin rate-lowering effect on full shots may be inadequate, resulting in a poor distance. When this value is too large, the initial velocity of the ball when struck may decrease, resulting in a poor distance, or the durability to cracking on repeated impact may worsen.

Letting Cs−3 be the Shore C hardness at a position 3 mm inside the core surface, the golf ball of this invention also satisfies the condition $$Cs-Cs-3 \leq 5.0. \quad (2)$$

That is, by optimizing the difference between the core surface hardness (Cs) and the hardness at the above given position (Cs−3), a lower spin rate on full shots and, in turn, an increased distance can be achieved, in addition to which a good durability to cracking is obtained. In formula (2) above, the upper limit value on the Shore C hardness scale is 5 or less, preferably 4 or less, and more preferably 3 or less. Also, in this formula (2), the lower limit value is preferably 0 or more, more preferably at least 1 or more, and even more preferably 2 or more. When the value of Cs−Cs−3 is too small, the spin rate-lowering effect on full shots may be inadequate and a good distance may not be achieved. On the other hand, when this value is too large, the durability to cracking on repeated impact may worsen.

The Shore C hardness at a position 3 mm inside the core surface (Cs−3) is preferably at least 66, more preferably at least 68, and even more preferably at least 70. The upper limit value is preferably 80 or less, more preferably 77 or less, and even more preferably 74 or less. When this value is too large, the feel at impact may become harder or the spin rate on full shots may rise so that the intended distance cannot be obtained. On the other hand, when this value is too small, the rebound may decrease, resulting in a poor distance, or the durability to cracking on repeated impact may worsen.

The Shore C hardness at a position 4 mm from the core center (Cc+4) is preferably at least 52, more preferably at least 54, and even more preferably at least 56. The upper limit value is preferably 63 or less, more preferably 61 or less, and even more preferably 59 or less. When this value is too large, the feel at impact may become harder or the spin rate on full shots may rise so that the intended distance cannot be achieved. On the other hand, when this value is too small, the core rebound may decrease, resulting in a poor distance by the ball, or the durability to cracking on repeated impact may worsen.

Next, the cover is described.

The cover has a material hardness on the Shore D scale which, although not particularly limited, is preferably at least 54, more preferably at least 56, and even more preferably at least 58. The upper limit is preferably not more than 68, more preferably not more than 65, and even more preferably not more than 62. The surface hardness of the cover (also referred to herein as the "ball surface hardness"), expressed on the Shore D scale, is preferably at least 60, more preferably at least 62, and even more preferably at least 64. The upper limit is preferably not more than 74, more preferably not more than 71, and even more preferably not more than 68. When the material hardness of the cover and the ball surface hardness are lower than the above respective ranges, the spin rate of the ball on shots with a driver (W #1) may rise and the ball initial velocity may decrease, as a result of which a good distance may not be achieved. On the other hand, when the material hardness of the cover and the ball surface hardness are too high, the durability to cracking on repeated impact may worsen.

The cover has a thickness of preferably at least 0.6 mm, more preferably at least 0.8 mm, and even more preferably at least 1.1 mm. The upper limit in the cover thickness is preferably not more than 1.8 mm, more preferably not more than 1.6 mm, and even more preferably not more than 1.4 mm. When the cover is too thin, the durability to cracking on repeated impact may worsen. When the cover is too thick, the spin rate of the ball on shots with a driver (W #1) may rise excessively and a good distance may not be achieved, or the feel at impact in the short game and on shots with a putter may be too hard.

Various types of thermoplastic resins, particularly ionomer resins, that are employed in golf ball cover stock may be suitably used as the cover material. Commercial products may be used as the ionomer resin. Alternatively, the cover-forming resin material that is used may be one obtained by blending, of commercially available ionomer resins, a high-acid ionomer resin having an acid content of at least 18 wt % into an ordinary ionomer resin. When the content of the high-acid ionomer resin is too high, the durability to cracking on repeated impact may worsen.

Figure 1:
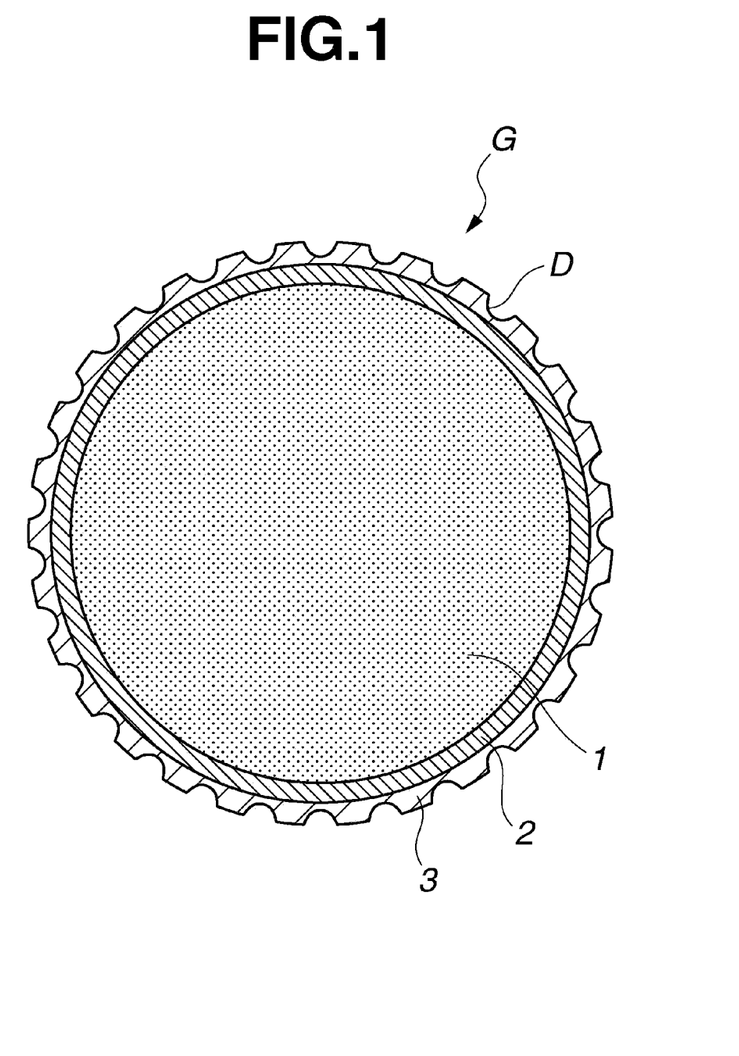
FIG. 1 is a schematic cross-sectional view of a golf ball having a three-layer construction according to one embodiment of the invention.

An intermediate layer may be provided between the above core and the above cover. That is, suitable ball constructions in the present invention are not limited to two-piece golf balls having a core and a single-layer cover; three-piece golf balls and four-piece golf balls may also be used. The use of golf balls composed of three layers—a core, an intermediate layer and a cover—is especially suitable. Such golf balls are exemplified by the golf ball G shown in FIG. 1. The golf ball G in FIG. 1 has a core 1, an intermediate layer 2 encasing the core 1, and a cover 3 encasing the intermediate layer 2. This cover 3 is positioned as the outermost layer, aside from a coating layer, in the layer structure of the golf ball. The intermediate layer may be a single layer or may be formed of two or more layers. Numerous dimples D are typically formed on the surface of the cover (outermost layer) 3 in order to enhance the aerodynamic properties of the ball. In addition, although not shown in the diagrams, a coating layer is formed on the surface of the cover 3.

Next, the intermediate layer is described.

The intermediate layer has a material hardness on the Shore D scale which, although not particularly limited, is preferably at least 47, more preferably at least 52, and even more preferably at least 55. The upper limit is preferably not more than 62, more preferably not more than 60, and even more preferably not more than 58. The surface hardness of the sphere obtained by encasing the core with the intermediate layer (intermediate layer-encased sphere), expressed on the Shore D scale, is preferably at least 53 more preferably at least 58, and even more preferably at least 61. The upper limit is preferably not more than 68, more preferably not more than 66, and even more preferably not more than 64. When the material and surface hardnesses of the intermediate layer are lower than the above respective ranges, the spin rate of the ball on full shots may rise excessively, resulting in a poor distance, or the durability of the ball to repeated impact may worsen. On the other hand, when the material and surface hardnesses are too high, the durability to cracking on repeated impact may worsen or the desired feel at impact may worsen.

The intermediate layer has a thickness of preferably at least 0.7 mm, more preferably at least 0.9 mm, and even more preferably at least 1.1 mm. The upper limit in the intermediate layer thickness is preferably not more than 1.6 mm, more preferably not more than 1.5 mm, and even more preferably not more than 1.4 mm. When the intermediate layer is too thin, the durability to cracking on repeated impact may worsen or the feel at impact may worsen. When the intermediate layer is too thick, the spin rate of the ball on full shots may rise and a good distance may not be obtained.

The intermediate layer-forming material may be a known resin. Examples of preferred materials include, but are not particularly limited to, resin compositions containing as the essential ingredients:
100 parts by weight of a resin component composed of, in admixture, (A) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and (B) a non-ionomeric thermoplastic elastomer
in a weight ratio between 100:0 and 50:50;

(C) from 5 to 120 parts by weight of a fatty acid and/or fatty acid derivative having a molecular weight of from 228 to 1,500; and (D) from 0.1 to 17 parts by weight of a basic inorganic metal compound capable of neutralizing un-neutralized acid groups in components A and C.

Components A to D in the intermediate layer-forming resin material described in, for example, JP-A 2010-253268 may be advantageously used as above components A to D.

A non-ionomeric thermoplastic elastomer may be included in the intermediate layer material. The amount of non-ionomeric thermoplastic elastomer included is preferably from 0 to 50 parts by weight per 100 parts by weight of the total amount of the base resin.

Exemplary non-ionomeric thermoplastic elastomers include polyolefin elastomers (including polyolefins and metallocene polyolefins), polystyrene elastomers, diene polymers, polyacrylate polymers, polyamide elastomers, polyurethane elastomers, polyester elastomers and polyacetals.

Depending on the intended application, optional additives may be suitably included in the intermediate layer material. For example, pigments, dispersants, antioxidants, ultraviolet absorbers and light stabilizers may be added. When these additives are included, the amount added per 100 parts by weight of the overall base resin is preferably at least 0.1 part by weight, and more preferably at least 0.5 part by weight. The upper limit is preferably not more than 10 parts by weight, and more preferably not more than 4 parts by weight.

The sphere obtained by encasing the core with the intermediate layer (intermediate layer-encased sphere) has a compressive deformation M (mm) when subjected to a final load of 1,275 N (130 kgf) from an initial load of 98 N (10 kgf) which, although not particularly limited, is preferably at least 3.5 mm, more preferably at least 3.7 mm, and even more preferably at least 3.9 mm. The upper limit is preferably not more than 4.7 mm, more preferably not more than 4.5 mm, and even more preferably not more than 4.3 mm. When the compressive deformation of the sphere is too small, i.e., when the sphere is too hard, the ball spin rate may rise excessively, resulting in a poor distance, or the feel at impact may become too hard. On the other hand, when the compressive deformation of the sphere is too large, i.e., when the sphere is too soft, the ball rebound may become too low, resulting in a poor distance, the feel at impact may become too soft, or the durability to cracking on repeated impact may worsen.

The manufacture of a multi-piece solid golf ball in which the above-described core, intermediate layer and cover (outermost layer) are formed as successive layers may be carried out in the usual manner such as by a known injection molding process. For example, a multi-piece golf ball can be obtained by injection-molding the intermediate layer material over the core so as to obtain an intermediate layer-encased sphere, and then injection-molding the cover material over the intermediate layer-encased sphere. Alternatively, the encasing members, i.e., the intermediate layer and the cover, may each be formed by enclosing the core or intermediate layer-encased sphere within two half-cups that have been pre-molded into hemispherical shapes, and then molding under applied heat and pressure.

The golf ball of the invention has a compressive deformation A when subjected to a final load of 5 kgf from an initial load state of 0.2 kgf that is preferably 0.18 mm or less, more preferably 0.17 mm or less, and even more preferably 0.16 mm or less. The lower limit is preferably at least 0.10 mm, and more preferably at least 0.12 mm. When this value becomes smaller, in cases where the smaller value is attributable to the cover hardness, the cover may be too hard and the durability of the ball to cracking under repeated impact may worsen. Alternatively, when the value becomes smaller owing to the hardness or thickness (diameter) of the intermediate layer and the core, the feel of the ball on full shots may become too hard. On the other hand, when the above value becomes larger, in cases where the larger value is attributable to the cover hardness, the spin rate of the ball on full shots may end up rising and a good distance may not be achieved. Alternatively, when the value becomes larger owing to the hardness or thickness (diameter) of the intermediate layer and the core, the initial velocity of the ball when struck on a full shot may decrease and a good distance may not be achieved.

The inventive golf ball has a compressive deformation B when subjected to a final load of 50 kgf from an initial load state of 5 kgf that is at least 1.30 mm, preferably at least 1.37 mm, and more preferably at least 1.44 mm. The upper limit is not more than 1.80 mm, preferably not more than 1.75 mm, and more preferably not more than 1.70 mm. When this value is small, the ball may have too hard a feel on shots with an iron or the spin rate may become high, resulting in a poor distance. On the other hand, when this value is large, the initial velocity on shots with an iron may become low, resulting in a poor distance.

The inventive golf ball has a compressive deformation C when subjected to a final load of 90 kgf from an initial load state of 5 kgf that is at least 2.45 mm, preferably at least 2.50 mm, and more preferably at least 2.55 mm. The upper limit is not more than 2.90 mm, preferably not more than 2.87 mm, and more preferably not more than 2.85 mm. When this value is small, the spin rate of the ball may rise and a good distance may not be achieved, or the feel at impact may become too hard. On the other hand, when this value is large, the initial velocity of the ball when struck may become too low, resulting in a poor distance, the feel at impact may become too soft, or the durability of the ball to cracking on repeated impact may worsen.

The inventive golf ball has a compressive deformation D when subjected to a final load of 130 kgf from an initial load state of 10 kgf that is preferably at least 3.10 mm, more preferably at least 3.15 mm, and even more preferably at least 3.20 mm. The upper limit is preferably not more than 3.80 mm, more preferably not more than 3.70 mm, and even more preferably not more than 3.60 mm. When this value is small, the spin rate of the ball may rise and a good distance may not be achieved, or the feel at impact may become too hard. On the other hand, when this value is large, the initial velocity of the ball when hit may become too low, resulting in a poor distance, the feel at impact may become too soft, or the durability of the ball to cracking on repeated impact may worsen.

The inventive golf ball has a compressive deformation E when subjected to a final load of 30 kgf from an initial load state of 5 kgf that is preferably at least 0.68 mm, more preferably at least 0.75 mm, and even more preferably at least 0.80 mm. The upper limit is preferably not more than 1.05 mm, more preferably not more than 1.03 mm, and even more preferably not more than 1.01 mm. When this value is small, the feel of the ball when struck with an iron may become too hard or the spin rate may rise, as a result of which a good distance may not be obtained. On the other hand, when this value is large, the initial velocity of the ball when struck with an iron may decrease and a good distance may not be achieved.

The ratio D/A between compressive deformation D and compressive deformation A is preferably at least 18.0, more preferably at least 19.0, and even more preferably at least 20.0. The upper limit is preferably not more than 25.0, more preferably not more than 24.5, and even more preferably not more than 24.0. Outside of this range, the ball may become too receptive to spin or the initial velocity of the ball when struck may decrease, and impact conditions under which the distance falls may emerge.

The ratio DB between compressive deformation D and compressive deformation B is preferably at least 2.02, more preferably at least 2.06, and even more preferably at least 2.10. The upper limit is preferably not more than 2.40, more preferably not more than 2.35, and even more preferably not more than 2.30. Outside of this range, the spin rate of the ball may end up increasing and impact conditions under which the distance falls may emerge.

The ratio D/C between compressive deformation D and compressive deformation C is preferably at least 1.23, more preferably at least 1.24, and even more preferably at least 1.25. The upper limit is preferably not more than 1.31, more preferably not more than 1.30, and even more preferably not more than 1.29. Outside of this range, the spin rate of the ball may end up increasing and impact conditions under which the distance falls may emerge.

The ratio D/E between compressive deformation D and compressive deformation E is preferably at least 3.50, more preferably at least 3.60, and even more preferably at least 3.70. The upper limit is preferably not more than 4.10, more preferably not more than 4.08, and even more preferably not more than 4.06. Outside of this range, impact conditions under which the distance falls may emerge, such as an increase in the spin rate of the ball.

Surface Hardness Relationships Among Layers

In this invention, it is preferable for the hardness relationships among the layers to satisfy formula (3) below:

Shore C hardness at cover (outermost layer) surface>Shore C hardness at intermediate layer surface>Shore C hardness at core surface>Shore C hardness at core center. (3)

Here, the hardness at the cover surface refers to the surface hardness of the ball, and the hardness at the intermediate layer surface refers to the surface hardness of the intermediate layer-encased sphere.

When the above hardness relationship is not satisfied, it may not be possible to achieve both a good flight performance and a soft feel at impact.

As indicated in the above formula, the cover surface hardness is higher than the intermediate layer surface hardness. The difference therebetween, i.e., the "cover surface hardness—intermediate layer surface hardness" value, expressed on the Shore C hardness scale, is preferably from 1 to 33, more preferably from 2 to 30, and even more preferably from 4 to 27. When this value is small, the spin rate of the ball on full shots may rise, as a result of which a good distance may not be achieved, or the feel at impact may worsen. On the other hand, when this value is large, the spin rate of the ball may rise, resulting in a poor distance, or the durability to cracking on repeated impact may worsen.

As indicated in the above formula, the intermediate layer surface hardness is higher than the core surface hardness. The difference therebetween, i.e., the "intermediate layer surface hardness–core surface hardness" value, expressed on the Shore C hardness scale, is preferably from 1 to 27, more preferably from 3 to 23, and even more preferably from 5 to 20. When this value is small, the spin rate of the ball may rise, as a result of which a good distance may not be achieved. On the other hand, when this value is large, the spin rate of the ball may rise, resulting in a poor distance, or the durability to cracking on repeated impact may worsen.

As indicated in the above formula, the core surface hardness is higher than the core center hardness. The relationship between the core surface hardness (Cs) and the core center hardness (Cc) is as described above.

Compressive Deformation Relationships Among Encased Spheres

Letting O and M be the compressive deformations (mm) of, respectively, the core and the intermediate layer-encased sphere when subjected to a final load of 1,275 N (130 kgf) from an initial load of 98 N (10 kgf), the value O−M is preferably from 0.1 to 0.8 mm, more preferably from 0.2 to 0.7 mm, and even more preferably from 0.3 to 0.6 mm.

When this value is small, the spin rate of the ball may rise, as a result of which a good distance may not be achieved. On the other hand, when this value is large, the feel at impact may worsen or the durability of the ball to repeated impact may worsen.

Letting O and D be the compressive deformations (mm) of, respectively, the core and the ball when subjected to a final load of 1,275 N (130 kgf) from an initial load of 98 N (10 kgf), the value O–D is preferably from 0.5 to 1.7 mm, more preferably from 0.6 to 1.4 mm, and even more preferably from 0.7 to 1.2 mm. When this value is small, the spin rate of the ball may rise, as a result of which a good distance may not be achieved. On the other hand, when this value is large, the initial velocity of the ball on shots with a driver (W #1) may become low and a good distance may not be obtained, or the durability to cracking on repeated impact may worsen.

Numerous dimples may be formed on the outside surface of the cover serving as the outermost layer. The number of dimples arranged on the cover surface, although not particularly limited, is preferably at least 250, more preferably at least 300, and even more preferably at least 320. The upper limit is preferably not more than 440, more preferably not more than 400, and even more preferably not more than 360. When the number of dimples is higher than this range, the ball trajectory may become lower, as a result of which the distance traveled by the ball may decrease. On the other hand, when the number of dimples is lower that this range, the ball trajectory may become higher, as a result of which a good distance may not be achieved. The arrangement of these dimples may have symmetry that follows a tetrahedral, octahedral, dodecahedral or other polyhedral/polygonal shape, or may have rotational symmetry along an axis connecting the poles of the ball.

It is recommended that preferably two or more dimple types, and more preferably three or more dimple types, of mutually differing diameter and/or depth be formed. With regard to the planar shapes of the dimples, a single dimple shape or a combination of two or more dimple shapes, such as circular shapes, various polygonal shapes, dewdrop shapes and oval shapes, may be suitably used. For example, when circular dimples are used, the dimple diameter may be set to at least about 2.5 mm and up to about 6.5 mm, and the dimple depth may be set to at least 0.07 mm and up to 0.30 mm. The cross-sectional shapes of the dimples may be defined as one or a combination of two or more types, including arcuate shapes, conical shapes, flat-bottomed shapes and curves expressed by various functions, and may have, other than near the dimple edges, a plurality of inflection points.

In order for the aerodynamic properties to be fully manifested, it is desirable for the dimple coverage ratio, i.e., the dimple surface coverage SR, which is the collective surface area of the imaginary spherical surfaces circumscribed by the edges of the individual dimples, as a percentage of the spherical surface area of the golf ball, to be set to at least 70% and not more than 90%. Also, to optimize the ball trajectory, it is desirable for the value Vo, defined as the spatial volume of the individual dimples below the flat plane circumscribed by the dimple edge, divided by the volume of the cylinder whose base is the flat plane and whose height is the maximum depth of the dimple from the base, to be set to at least 0.35 and not more than 0.80. Moreover, it is preferable for the ratio VR of the sum of the volumes of the individual dimples, each formed below the flat plane circumscribed by the edge of the dimple, with respect to the volume of the ball sphere were the ball to have no dimples on its surface, to be set to at least 0.6% and not more than 1.0%. Outside of the above ranges in these respective values, the resulting trajectory may not enable a good distance to be achieved and so the ball may fail to travel a fully satisfactory distance. Also, to satisfy the rule for symmetry of the ball's carry, dimple volumes near the poles may be made smaller, and dimple volumes near the equator may be made larger, than the volumes of dimples away from the poles and the equator.

To ensure a good ball appearance, it is preferable to apply a clear coating onto the cover surface. The coating composition used in clear coating is preferably one which uses two types of polyester polyol as the base resin and uses a polyisocyanate as the curing agent. In this case, various organic solvents can be admixed depending on the intended coating conditions. Examples of organic solvents that can be used include aromatic solvents such as toluene, xylene and ethylbenzene; ester solvents such as ethyl acetate, butyl acetate, propylene glycol methyl ether acetate and propylene glycol methyl ether propionate; ketone solvents such as acetone, methyl ethyl ketone, methyl isobutyl ketone and cyclohexanone; ether solvents such as diethylene glycol dimethyl ether, diethylene glycol diethyl ether and dipropylene glycol dimethyl ether; alicyclic hydrocarbon solvents such as cyclohexane, methyl cyclohexane and ethyl cyclohexane; and petroleum hydrocarbon-based solvents such as mineral spirits.

The coating layer obtained by clear coating has a hardness which, on the Shore C hardness scale, is preferably from 40 to 80, more preferably from 47 to 72, and even more preferably from 55 to 65. When the coating layer is too soft, mud may tend to stick to the surface of the ball when used for golfing. On the other hand, when the coating layer is too hard, it may tend to peel off when the ball is struck.

The value obtained by subtracting the material hardness of the coating layer from the material hardness of the cover, expressed on the Shore C hardness scale, is preferably from 10 to 50, more preferably from 20 to 40, and even more preferably from 25 to 35. At a value larger than this numerical range, mud tends to stick to the surface of the ball when used for golfing. On the other hand, at a value smaller than this numerical range, cracking and peeling of the coating layer tend to arise when the ball is struck.

The coating layer has a thickness of typically from 9 to 22 µm, preferably from 11 to 20 and more preferably from 13 to 18 µm.

The multi-piece solid golf ball of the invention can be made to conform to the Rules of Golf for play. The inventive ball may be formed to a diameter which is such that the ball does not pass through a ring having an inner diameter of 42.672 mm and is not more than 42.80 mm, and to a weight which is preferably between 45.0 and 45.93 g.

EXAMPLES

The following Examples and Comparative Examples are provided to illustrate the invention, and are not intended to limit the scope thereof.

Examples 1 to 6, Comparative Examples 1 to 6

Formation of Core

Solid cores were produced by preparing rubber compositions for Examples 1, 3, 5 and 6 and Comparative Examples 1 to 4 shown in Table 1, and then molding/vulcanizing the compositions under vulcanization conditions of 155° C. and 15 minutes.

The solid cores in Examples 2 and 4 and in Comparative Examples 5 and 6 are similarly produced.

TABLE 1

| Core formulation (pbw) | Example | | | | | | Comparative Example | | | | | |
| --- | --- | --- | --- | --- | --- | --- | --- | --- | --- | --- | --- | --- |
| | 1 | 2 | 3 | 4 | 5 | 6 | 1 | 2 | 3 | 4 | 5 | 6 |
| Polybutadiene A | 100 | 100 | 100 | 100 | 100 | 100 | 100 | 100 | 100 | 100 | 80 | 80 |
| Polybutadiene B | | | | | | | | | | | 20 | 20 |
| Zinc acrylate (1) | 29.0 | 26.9 | 28.4 | 27.8 | 28.4 | 30.3 | 38.9 | 40.3 | 29.7 | 29.0 | 25.8 | |
| Zinc acrylate (2) | | | | | | | | | | | | 29.6 |
| Organic peroxide (1) | 0.5 | 0.5 | 0.5 | 0.5 | 0.5 | 0.5 | 0.5 | 0.5 | 0.5 | 0.5 | 0.6 | 1.0 |
| Organic peroxide (2) | | | | | | | | | | | 0.6 | |
| Propylene glycol | 1.5 | 1.0 | 1.5 | 1.5 | 1.5 | 1.5 | 1.5 | 1.5 | 1.5 | 1.5 | | |
| Water | | | | | | | | | | | | 1.0 |
| Zinc stearate | | | | | | | | | | | 5.0 | |
| Antioxidant (1) | | | | | | | | | | | 0.1 | 0.1 |
| Antioxidant (2) | 0.5 | 0.5 | 0.5 | 0.5 | 0.5 | 0.5 | 0.5 | 0.5 | 0.5 | 0.5 | | |
| Barium sulfate | | | | | | | | | | | 23.1 | 21.5 |
| Zinc oxide | 23.4 | 22.9 | 26.3 | 25.2 | 26.3 | 22.7 | 22.4 | 21.5 | 17.4 | 18.7 | 4.0 | 4.0 |
| Zinc salt of pentachlorothiophenol | 1.0 | 1.0 | 1.0 | 1.0 | 1.0 | 1.0 | 1.0 | 1.0 | 1.0 | 1.0 | 0.2 | 0.3 |

Details on the ingredients mentioned in Table 1 are given below.

Polybutadiene A: Available under the trade name "BR 01" from JSR Corporation

Polybutadiene B: Available under the trade name "BR 730" from JSR Corporation

Zinc acrylate (1): "ZN-DA85S" from Nippon Shokubai Co., Ltd.

Zinc acrylate (2): "Sanceler SR" from Sanshin Chemical Industry Co., Ltd.

Organic Peroxide (1): Dicumyl peroxide, available under the trade name "Percumyl D" from NOF Corporation Organic Peroxide (2): A mixture of 1,1-di(t-butylperoxy) cyclohexane and silica, available under the trade name "Perhexa C-40" from NOF Corporation Propylene glycol: A lower divalent alcohol (molecular weight, 76.1), from Hayashi Pure Chemical Ind., Ltd.

Water: Pure water (from Seiki Chemical Industrial Co., Ltd.)

Zinc stearate: "Zinc Stearate G" from NOF Corporation

Antioxidant (1): 2,2'-Methylenebis(4-methyl-6-butylphenol), available under the trade name "Nocrac NS-6" from Ouchi Shinko Chemical Industry Co., Ltd.

Antioxidant (2): 2-Mercaptobenzimidazole, available under the trade name "Nocrac MB" from Ouchi Shinko Chemical Industry Co., Ltd.

Barium sulfate: Barite powder, available as "Barico #100" from Hakusui Tech

Zinc oxide: Available under the trade name "Zinc Oxide Grade 3" from Sakai Chemical Co., Ltd.

Zinc salt of pentachlorothiophenol:
Available from Wako Pure Chemical Industries, Ltd.

Formation of Intermediate Layer

Next, in Examples 1, 3, 5 and 6 and Comparative Examples 1 and 2, an intermediate layer was formed by injection-molding the intermediate layer material formulated as shown in Table 2 over the core, thereby giving an intermediate layer-encased sphere.

The intermediate layer-encased spheres in Examples 2 and 4 and in Comparative Examples 5 and 6 are similarly obtained.

Formation of Cover (Outermost Layer)

Next, in Examples 1, 3, 5 and 6 and Comparative Examples 1 and 2, a cover (outermost layer) was formed by injection-molding the cover material formulated as shown in Table 2 over the intermediate layer-encased sphere obtained as described above. The cover (outermost layer) in Examples 2 and 4 and in Comparative Examples 5 and 6 is similarly obtained.

In Comparative Examples 3 and 4, the cover (outermost layer) was formed by injection-molding the cover material directly over the core.

A plurality of given dimples common to all the Examples and Comparative Examples are formed on the surface of the cover.

TABLE 2

| Resin composition (pbw) | I | II | III | IV | V | VI | VII | VIII |
| --- | --- | --- | --- | --- | --- | --- | --- | --- |
| Himilan 1605 | 44 | 36 | | | 50 | 50 | | |
| Himilan 1557 | | | | | | | 37.5 | 42.5 |
| Himilan 1601 | | | | | | | 37.5 | 42.5 |
| AM7329 | | | | | 15 | 50 | | |
| Surlyn 9320 | | | | | 35 | | | |
| AN4319 | | | | | | | 25 | 15 |
| HPF 1000 | 56 | 64 | | 100 | | | | |
| HPF 2000 | | | 100 | | | | | |
| Titanium oxide | | | | | 4 | 4 | 4 | 4 |

Trade names of the chief materials mentioned in the table are given below.

Himilan, AM7329: Ionomers available from Dow-Mitsui Polychemicals Co., Ltd.

Surlyn: An ionomer available from The Dow Chemical Company

AN4319: Available under the trade name "Nucrel" from Dow-Mitsui Polychemicals Co., Ltd.

HPF 1000: Dow™ 1000, from The Dow Chemical Company

HPF 2000: Dow™ HPF 2000, from The Dow Chemical Company

Titanium oxide: Available from Sakai Chemical Industry Co., Ltd.

Figure 2A:
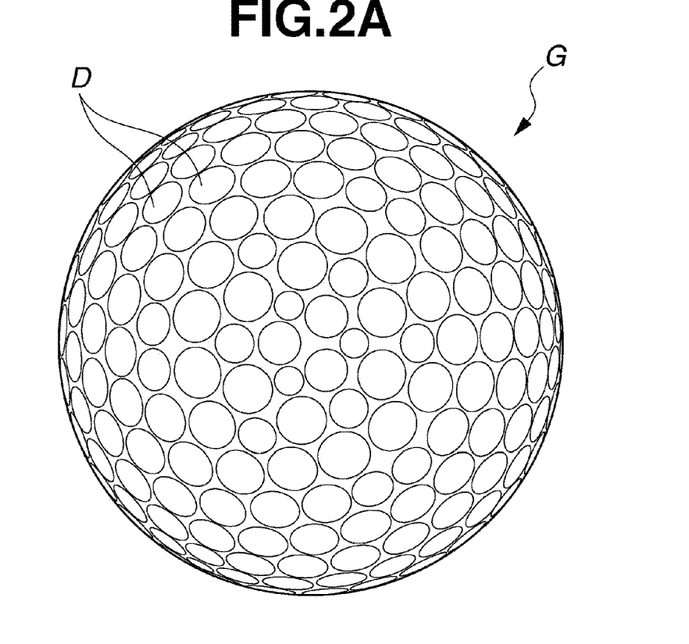
FIGS. 2A and 2B are, respectively, a top view and a side view of the exterior of a golf ball showing the arrangement of dimples common to all of the Examples and Comparative Examples described in the present Specification.
Figure 2B:
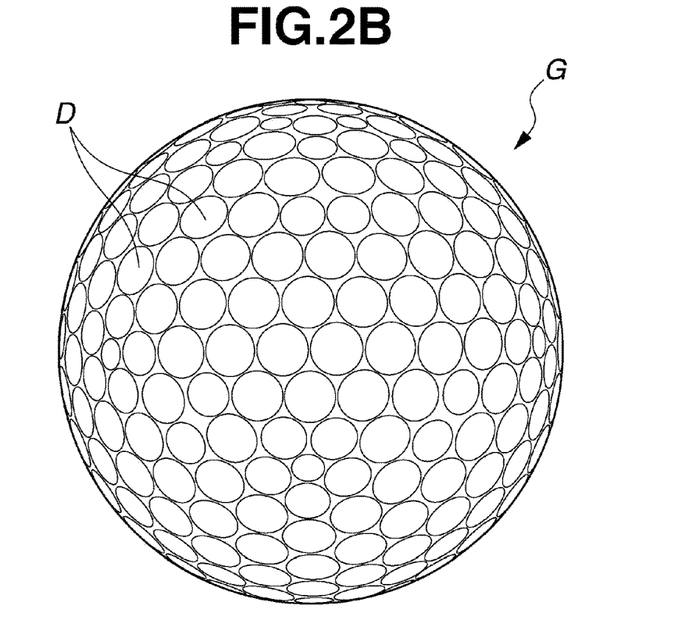

Eight types of circular dimples were used. The dimples and the dimple arrangement were common to all of the Examples and Comparative Examples. Details on the dimples are shown in Table 3 below, and the dimple arrangement is shown in FIG. 2. FIG. 2A is a plan view of the dimples, and FIG. 2B is a side view of the same.

TABLE 3

| Dimple A | Number | Diameter (mm) | Depth (mm) | Volume (mm3) | Cylinder volume ratio | SR (%) | VR (%) |
|---|---|---|---|---|---|---|---|
| A-1 | 12 | 4.6 | 0.118 | 1.111 | 0.566 | 82.3 | 0.77 |
| A-2 | 198 | 4.45 | 0.117 | 1.031 | 0.566 | | |
| A-3 | 36 | 3.85 | 0.114 | 0.752 | 0.566 | | |
| A-4 | 12 | 2.75 | 0.085 | 0.286 | 0.566 | | |
| A-5 | 36 | 4.45 | 0.126 | 1.110 | 0.566 | | |
| A-6 | 24 | 3.85 | 0.123 | 0.811 | 0.566 | | |
| A-7 | 6 | 3.4 | 0.115 | 0.558 | 0.534 | | |
| A-8 | 6 | 3.3 | 0.115 | 0.526 | 0.534 | | |
| Total | 330 | | | | | | |

Dimple Definitions

Edge: Highest place in cross-section passing through center of dimple.

Diameter: Diameter of flat plane circumscribed by edge of dimple.

Depth: Maximum depth of dimple from flat plane circumscribed by edge of dimple.

SR: Sum of individual dimple surface areas, each defined by flat plane circumscribed by edge of dimple, as a percentage of spherical surface area of ball were it to have no dimples thereon.

Dimple volume: Dimple volume below flat plane circumscribed by edge of dimple.

Cylinder volume ratio:
Ratio of dimple volume to volume of cylinder having same diameter and depth as dimple.

VR: Sum of volumes of individual dimples formed below flat plane circumscribed by edge of dimple, as a percentage of volume of ball sphere were it to have no dimples thereon.

Formation of Coating Layer

Next, the coating composition shown in Table 4 below is applied with an air spray gun onto the surface of the cover (outermost layer) on which numerous dimples have been formed, thereby producing golf balls having a 15 μm-thick coating layer formed thereon.

TABLE 4

| Coating composition C (pbw) | Base resin | Polyol | 29.77 |
|---|---|---|---|
| | | Additive | 0.22 |
| | | Solvent | 70.01 |
| | Curing agent | Isocyanate | 42 |
| | | Solvent | 58 |
| Coating layer | | Shore C hardness | 62.5 |
| | | Thickness (μm) | 15 |

A polyester polyol synthesized as follows is used as the polyol in the base resin.

A reactor equipped with a reflux condenser, a dropping funnel, a gas inlet and a thermometer was charged with 140 parts by weight of trimethylolpropane, 95 parts by weight of ethylene glycol, 157 parts by weight of adipic acid and 58 parts by weight of 1,4-cyclohexanedimethanol, following which the temperature was raised to between 200 and 240° C. under stirring and the reaction was effected by 5 hours of heating. This yielded a polyester polyol having an acid value of 4, a hydroxyl value of 170 and a weight-average molecular weight (Mw) of 28,000. The additive was a water-repellent additive. All the additives used were commercial products. Products that were silicone-based additives, stain resistance-improving silicone additives, or fluoropolymers having an alkyl group chain length of 7 or less were added.

The isocyanate used in the curing agent is Duranate™ TPA-100 (from Asahi Kasei Corporation; NCO content, 23.1%; 100% nonvolatiles), which is an isocyanurate of hexamethylene diisocyanate (HMDI).

Butyl acetate was used as the base resin solvent, and ethyl acetate and butyl acetate were used as the curing agent solvents. The Shore C hardness value in the table is obtained by preparing sheets having a thickness of 2 mm, stacking together three of the sheets, and carrying out measurement with a Shore C durometer in accordance with ASTM D2240.

Various properties of the resulting golf balls, including the core center and surface hardnesses and the hardnesses at given positions in the core, the diameters of the core and the respective layer-encased spheres, the thickness and material hardness of each layer, and the surface hardnesses and compressive deformations under given loading of the respective layer-encased spheres, are evaluated by the following methods. The results are presented in Table 5.

Diameters of Core and Intermediate Layer-Encased Sphere

The diameters at five random places on the surface are measured at a temperature of 23.9±1° C. and, using the average of these measurements as the measured value for a single core or intermediate layer-encased sphere, the average diameter for ten test specimens is determined.

Diameter of Ball

The diameters at 15 random dimple-free areas on the surface of a ball are measured at a temperature of 23.9±1° C. and, using the average of these measurements as the measured value for a single ball, the average diameter for ten measured balls is determined.

Compressive Deformations of Ball

A golf ball is placed on a hard plate and the compressive deformation A of the ball when subjected to a final load of 5 kgf from an initial load of 0.2 kgf, the compressive deformation B of the ball when subjected to a final load of 50 kgf from an initial load of 5 kgf, the compressive deformation C of the ball when subjected to a final load of 90 kgf from an initial load of 5 kgf, the compressive deformation D of the ball when subjected to a final load of 130 kgf from an initial load of 10 kgf and the compressive deformation E of the ball when subjected to a final load of 30 kgf from an initial load of 5 kgf are each measured. These compressive deformations refer in each case to a measured value obtained after holding the golf ball isothermally at 23.9° C. The instrument used is a high-load compression tester available from MU Instruments Trading Corporation. Measurement is carried out with the pressing head moving downward at a speed of 4.7 mm/sec.

Compressive Deformations of Core and Intermediate Layer-Encased Sphere

The compressive deformation 0 of the core when subjected to a final load of 130 kgf from an initial load of 10 kgf and the compressive deformation M of the intermediate layer-encased sphere when subjected to a final load of 130 kgf from an initial load of 10 kgf are each measured. The instrument used and the measurement conditions are the same as when measuring the above-described compressive deformations of the ball.

Core Hardness Profile

The indenter of a durometer is set substantially perpendicular to the spherical surface of the core, and the core surface hardness on the Shore C hardness scale is measured in accordance with ASTM D2240. The hardnesses at the center and specific positions of the core are measured as Shore C hardness values by perpendicularly pressing the indenter of a durometer against the center portion and the specific positions shown in Table 5 on the flat cross-section obtained by cutting the core into hemispheres. The P2 Automatic Rubber Hardness Tester (Kobunshi Keiki Co., Ltd.) equipped with a Shore C durometer can be used for measuring the hardness. The maximum value is read off as the hardness value. Measurements are all carried out in a 23±2° C. environment. Shore D hardnesses are measured in the same way after replacing the Shore C hardness measuring attachment on the P2 Automatic Rubber Hardness Tester with one for measuring the Shore D hardness.

Material Hardnesses (Shore D Hardnesses) of Intermediate Layer and Cover

The resin material for each layer is molded into a sheet having a thickness of 2 mm and left to stand for at least two weeks. The Shore D hardness of each material is then measured in accordance with ASTM D2240. The P2 Automatic Rubber Hardness Tester (Kobunshi Keiki Co., Ltd.) on which a Shore D durometer has been mounted is used for measuring the hardness. The maximum value is read off as the hardness value. Measurements are all carried out in a 23±2° C. environment.

Surface Hardnesses (Shore C Hardness and Shore D Hardness) of Intermediate Layer-Encased Sphere and Ball These hardnesses are measured by perpendicularly pressing an indenter against the surfaces of the respective spheres. The surface hardness of a ball (cover) is the value measured at a dimple-free area (land) on the surface of the ball. The Shore D hardness is measured using a Shore D durometer in accordance with ASTM D2240. A P2 Automatic Rubber Hardness Tester (Kobunshi Keiki Co., Ltd.) on which a Shore C durometer and a Shore D durometer have both been mounted is used for measuring the hardnesses. The maximum value is read off as the hardness value. Measurements are all carried out in a 23±2° C. environment.

TABLE 5

| | | | Example | | | | | | Comparative Example | | | | | |
|---|---|---|---|---|---|---|---|---|---|---|---|---|---|---|
| | | | 1 | 2 | 3 | 4 | 5 | 6 | 1 | 2 | 3 | 4 | 5 | 6 |
| Construction (piece) | | | 3P | 3P | 3P | 3P | 3P | 3P | 3P | 3P | 2P | 2P | 3P | 3P |
| Core | Diameter (mm) | | 37.4 | 37.4 | 37.2 | 37.3 | 37.2 | 37.4 | 37.3 | 37.3 | 39.6 | 39.3 | 37.4 | 37.4 |
| | Weight (g) | | 32.5 | 32.5 | 32.5 | 32.5 | 32.5 | 32.5 | 32.7 | 32.6 | 37.5 | 36.8 | 32.5 | 32.5 |
| | Compressive deformation O (mm) | | 4.4 | 4.4 | 4.5 | 4.6 | 4.5 | 4.2 | 3.3 | 3.2 | 4.3 | 4.4 | 4.2 | 4.2 |
| | Hardness profile | Surface hardness (Cs) (Shore C) | 73.5 | 73.4 | 73.7 | 73.1 | 73.7 | 75.6 | 81.2 | 81.4 | 75.0 | 74.3 | 73.7 | 84.3 |
| | | Hardness 3 mm inside surface (Cs-3) (Shore C) | 71.7 | 71.6 | 71.1 | 70.5 | 71.1 | 72.9 | 78.8 | 79.3 | 72.3 | 71.7 | 68.7 | 77.9 |
| | | Hardness at position 4 mm from core center (C4) (Shore C) | 57.5 | 58.3 | 57.4 | 57.2 | 57.4 | 57.8 | 59.5 | 59.9 | 57.6 | 57.5 | 62.3 | 60.3 |
| | | Center hardness (Cc) (Shore C) | 52.4 | 53.2 | 52.4 | 52.0 | 52.4 | 53.5 | 56.9 | 57.4 | 53.1 | 52.8 | 58.5 | 57.2 |
| | | Surface hardness-Center hardness (Cs-Cc) (Shore C) | 21.1 | 20.2 | 21.3 | 21.0 | 21.3 | 22.1 | 24.4 | 24.0 | 21.8 | 21.6 | 15.2 | 27.1 |
| | | Cs-Cs-3 (Shore C) | 1.8 | 1.8 | 2.6 | 2.6 | 2.6 | 2.7 | 2.4 | 2.1 | 2.7 | 2.6 | 5.0 | 6.4 |
| | | Surface hardness (Cs) (Shore D) | 40.9 | 40.8 | 41.0 | 40.5 | 41.0 | 42.5 | 46.7 | 46.8 | 42.0 | 41.5 | 41.0 | 49.1 |
| | | Center hardness (Cc) (Shore D) | 29.9 | 30.3 | 29.9 | 29.7 | 29.9 | 30.5 | 32.2 | 32.5 | 30.3 | 30.1 | 33.1 | 32.4 |
| | | Surface hardness-Center hardness (Cs-Cc) (Shore D) | 11.0 | 10.5 | 11.1 | 10.9 | 11.1 | 12.0 | 14.5 | 14.4 | 11.7 | 11.4 | 8.0 | 16.7 |
| Intermediate layer | Material | | I | I | I | I | II | III | IV | I | — | — | III | III |
| | Thickness (mm) | | 1.3 | 1.3 | 1.4 | 1.3 | 1.4 | 1.3 | 1.4 | 1.4 | — | — | 1.3 | 1.3 |
| | Material hardness (Shore D) | | 57.0 | 57.0 | 57.0 | 57.0 | 56.0 | 47.0 | 50.0 | 57.0 | — | — | 47.0 | 47.0 |
| Intermediate layer-encased sphere | Diameter (mm) | | 40.0 | 40.0 | 40.0 | 40.0 | 40.0 | 40.0 | 40.0 | 40.0 | — | — | 40.0 | 40.0 |
| | Weight (g) | | 38.7 | 38.7 | 38.8 | 38.7 | 38.8 | 38.7 | 38.8 | 38.8 | — | — | 38.7 | 38.7 |
| | Compressive deformation M (mm) | | 3.9 | 3.9 | 4.1 | 4.3 | 4.1 | 4.0 | 3.1 | 2.8 | — | — | 4.0 | 4.0 |
| | Surface hardness | Shore D | 61.8 | 61.8 | 61.4 | 61.7 | 59.9 | 53.0 | 57.8 | 61.8 | — | — | 53.0 | 53.0 |
| | | Shore C | 91.6 | 91.6 | 91.4 | 91.5 | 91.7 | 81.2 | 89.2 | 93.3 | — | — | 81.2 | 81.2 |
| Intermediate layer surface hardness-Core surface hardness (Shore C) | | | 18.1 | 18.2 | 17.7 | 18.5 | 18.0 | 5.6 | 8.0 | 12.0 | — | — | 7.4 | -3.2 |
| Difference in compressive deformation between core and intermediate layer-encased sphere (O-M) (mm) | | | 0.5 | 0.5 | 0.4 | 0.3 | 0.4 | 0.2 | 0.2 | 0.3 | — | — | 0.2 | 0.2 |
| Cover | Material | | V | V | V | V | V | V | VI | VI | VII | VIII | V | V |
| | Thickness (mm) | | 1.4 | 1.4 | 1.3 | 1.4 | 1.3 | 1.4 | 1.4 | 1.4 | 1.6 | 1.7 | 1.4 | 1.4 |
| | Material hardness | Shore D | 59.0 | 59.0 | 59.0 | 59.0 | 59.0 | 59.0 | 63.0 | 63.0 | 56.0 | 58.0 | 59.0 | 59.0 |
| | | Shore C | 88.2 | 88.2 | 88.2 | 88.2 | 88.2 | 88.2 | 93.4 | 93.4 | 84.2 | 86.8 | 88.2 | 88.2 |
| Coating layer | Material (Coating C) | | C | C | C | C | C | C | C | C | C | C | C | C |
| | Material hardness (Shore C) | | 62.5 | 62.5 | 62.5 | 62.5 | 62.5 | 62.5 | 62.5 | 62.5 | 62.5 | 62.5 | 62.5 | 62.5 |
| Cover material hardness-Coating layer material hardness (Shore C) | | | 25.7 | 25.7 | 25.7 | 25.7 | 25.7 | 25.7 | 30.9 | 30.9 | 21.7 | 24.3 | 25.7 | 25.7 |
| Ball | Diameter (mm) | | 42.7 | 42.7 | 42.7 | 42.7 | 42.7 | 42.7 | 42.7 | 42.7 | 42.7 | 42.7 | 42.7 | 42.7 |
| | Weight (g) | | 45.3 | 45.3 | 45.4 | 45.3 | 45.3 | 45.4 | 45.4 | 45.4 | 45.4 | 45.4 | 45.4 | 45.4 |
| | Compressive deformation A under 0.2 to 5 kgf loading (mm) | | 0.15 | 0.15 | 0.15 | 0.15 | 0.16 | 0.17 | 0.11 | 0.11 | 0.26 | 0.27 | 0.17 | 0.17 |

TABLE 5-continued

|  |  | Example | | | | | | Comparative Example | | | | | |
| --- | --- | --- | --- | --- | --- | --- | --- | --- | --- | --- | --- | --- | --- |
|  |  | 1 | 2 | 3 | 4 | 5 | 6 | 1 | 2 | 3 | 4 | 5 | 6 |
| Compressive deformation E under 5 to 30 kgf loading (mm) | | 0.81 | 0.81 | 0.88 | 0.94 | 0.90 | 1.01 | 0.65 | 0.55 | 1.18 | 1.11 | 1.01 | 1.01 |
| Compressive deformation B under 5 to 50 kgf loading (mm) | | 1.44 | 1.44 | 1.55 | 1.65 | 1.58 | 1.70 | 1.19 | 0.95 | 1.92 | 1.84 | 1.70 | 1.70 |
| Compressive deformation C under 5 to 90 kgf loading (mm) | | 2.56 | 2.56 | 2.70 | 2.83 | 2.78 | 2.85 | 2.11 | 1.78 | 3.09 | 2.97 | 2.85 | 2.85 |
| Compressive deformation D under 10 to 130 kgf oading (mm) | | 3.28 | 3.28 | 3.44 | 3.60 | 3.50 | 3.55 | 2.71 | 2.33 | 3.79 | 3.69 | 3.55 | 3.55 |
| Surface hardness | Shore D | 65.0 | 65.0 | 65.0 | 65.0 | 65.0 | 65.0 | 69.0 | 69.0 | 62.0 | 64.0 | 65.0 | 65.0 |
|  | Shore C | 96.1 | 96.1 | 96.1 | 96.1 | 96.1 | 96.1 | 100.0 | 100.0 | 92.1 | 94.7 | 96.1 | 96.1 |
| Ball surface hardness-Core surface hardness (Shore C) | | 22.6 | 22.7 | 22.4 | 23.0 | 22.4 | 20.5 | 18.8 | 18.7 | 17.1 | 20.4 | 22.4 | 11.7 |
| Ball surface hardness-Intermediate layer surface hardness (Shore C) | | 4.5 | 4.5 | 4.7 | 4.5 | 4.4 | 14.9 | 10.8 | 6.7 | — | — | 14.9 | 14.9 |
| Difference in compressive deformation between core and ball (O-D) (mm) | | 1.1 | 1.1 | 1.1 | 1.0 | 1.0 | 0.6 | 0.6 | 0.8 | 0.5 | 0.7 | 0.6 | 0.6 |
| Compressive deformation ratio D/A | | 21.9 | 21.9 | 22.9 | 24.0 | 22.5 | 20.9 | 24.7 | 21.8 | 14.5 | 13.6 | 20.9 | 20.9 |
| Compressive deformation ratio D/B | | 2.28 | 2.28 | 2.22 | 2.18 | 2.22 | 2.10 | 2.28 | 2.45 | 1.98 | 2.01 | 2.10 | 2.10 |
| Compressive deformation ratio D/C | | 1.28 | 1.28 | 1.28 | 1.27 | 1.26 | 1.25 | 1.29 | 1.31 | 1.23 | 1.24 | 1.25 | 1.25 |
| Compressive deformation ratio D/E | | 4.04 | 4.04 | 3.92 | 3.82 | 3.90 | 3.53 | 4.17 | 4.23 | 3.22 | 3.32 | 3.53 | 3.53 |

The flight performance, feel at impact and durability to cracking of each golf ball are evaluated by the following methods. The results are shown in Table 7.

Flight Performance

The distances traveled by the balls when struck under the conditions shown in Table 6 below by various clubs (W #1, I #6) mounted on a golf swing robot are measured and rated according to the criteria in the table.

TABLE 6

|  |  | W #1 | W #1 | I #6 |
| --- | --- | --- | --- | --- |
| Club used | Product name | PHYZ | PHYZ | PHYZ |
|  | Conditions | HS, 40 m/s | HS, 35 m/s | HS, 35 m/s |
| Rating criteria | Good | ≥200.0 m | ≥180.0 m | ≥138.5 m |
|  | NG | ≤199.9 m | ≤179.9 m | ≤138.4 m |

Regarding the club name "PHYZ" in the above table, the PHYZ Driver (loft angle, 10.5°) and PHYZ Iron I #6, both manufactured by Bridgestone Sports Co., Ltd., are used.

Feel

Sensory evaluations are carried out when the balls are hit with a driver (W #1) by amateur golfers having head speeds of 30 to 40 m/s. The balls are rated for "soft feel" according to the following criteria.

Good: Twelve or more of 20 golfers rate the ball as having a soft feel

Fair: At least 7 and up to 11 of 20 golfers rate the ball as having a soft feel

NG: Six or fewer of 20 golfers rate the ball as having a soft feel

Durability to Cracking on Repeated Impact

Ten sample balls (N=10) from each Example are repeatedly struck with a driver (W #1) at a head speed of 45 m/s and the durability is rated as follows. The number of shots after which a ball begins to crack is counted for each of the ten balls. Of these balls, the three balls having the lowest number of shots on cracking are selected and the average number of shots on cracking for the three balls is treated as the "number of shots on cracking" for that Example. Durability indexes are determined for each Example based on a durability index of 100 for the number of shots on cracking in Example 1.

Rating Criteria:

Good: Durability index is 80 or more
NG: Durability index is less than 80

TABLE 7

|  |  |  | Example | | | | | | Comparative Example | | | | | |
| --- | --- | --- | --- | --- | --- | --- | --- | --- | --- | --- | --- | --- | --- | --- |
|  |  |  | 1 | 2 | 3 | 4 | 5 | 6 | 1 | 2 | 3 | 4 | 5 | 6 |
| Flight | W #1 HS = 40 m/s | Spin rate (rpm) | 2,815 | 2,852 | 2,730 | 2,727 | 2,724 | 2,709 | 2,803 | 3,049 | 2,699 | 2,734 | 2,756 | 2,666 |
|  |  | Total distance (m) | 200.6 | 200.0 | 201.7 | 201.7 | 201.8 | 200.9 | 203.3 | 197.7 | 197.8 | 198.4 | 200.7 | 201.3 |
|  |  | Rating | good | good | good | good | good | good | good | NG | NG | NG | good | good |
|  | W #1 HS = 35 m/s | Spin rate (rpm) | 2,802 | 2,842 | 2,737 | 2,725 | 2,712 | 2,722 | 2,921 | 3,152 | 2,621 | 2,740 | 2,773 | 2,662 |
|  |  | Total distance (m) | 180.4 | 180.1 | 181.7 | 181.2 | 180.7 | 181.4 | 182.6 | 177.7 | 181.0 | 180.6 | 181.2 | 181.9 |
|  |  | Rating | good | good | good | good | good | good | good | NG | good | good | good | good |
|  | I #6 | Spin rate (rpm) | 5,250 | 5,348 | 5,196 | 5,196 | 5,196 | 5,384 | 5,813 | 5,924 | 5,210 | 5,262 | 5,580 | 5,210 |
|  |  | Total distance (m) | 139.9 | 139.1 | 140.4 | 140.5 | 140.7 | 138.9 | 136.4 | 135.1 | 137.6 | 137.9 | 137.7 | 140.1 |
|  |  | Rating | good | good | good | good | good | good | NG | NG | NG | NG | NG | good |

TABLE 7-continued

| | | Example | | | | | | Comparative Example | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Feel at impact | Rating | good | good | good | good | good | good | NG | NG | good | good | good | good |
| Durability to repeated impact | Rating | good | good | good | good | good | good | good | good | NG | NG | good | NG |

As demonstrated by the results in Table 7, the golf balls of Comparative Examples 1 to 6 were inferior in the following respects to the golf balls according to the present invention that were obtained in Examples 1 to 6.

In Comparative Example 1, the compressive deformation B of the ball when subjected to a final load of 50 kgf from an initial load state of 5 kgf was smaller than 1.30 mm and the compressive deformation C of the ball when subjected to a final load of 90 kgf from an initial load of 5 kgf was smaller than 2.45 mm. As a result, the spin rate of the ball on shots with a number six iron (I #6) increased so that the distance traveled by the ball was inferior, in addition to which the soft feel was inferior.

In Comparative Example 2, the compressive deformation B of the ball when subjected to a final load of 50 kgf from an initial load state of 5 kgf was smaller than 1.30 mm and the compressive deformation C of the ball when subjected to a final load of 90 kgf from an initial load of 5 kgf was smaller than 2.45 mm. As a result, the spin rate of the ball on shots with a driver (W #1) and a number six iron (I #6) increased so that the distance traveled by the ball was inferior, in addition to which the soft feel was inferior.

In Comparative Example 3, the compressive deformation B of the ball when subjected to a final load of 50 kgf from an initial load state of 5 kgf was larger than 1.80 mm and the compressive deformation C of the ball when subjected to a final load of 90 kgf from an initial load of 5 kgf was larger than 2.90 mm. As a result, the initial velocity on shots was low and so the distance traveled by the ball on shots with a driver (W #1) and a number six iron (I #6) was inferior. In addition, the durability to repeated impact was poor.

In Comparative Example 4, the compressive deformation B of the ball when subjected to a final load of 50 kgf from an initial load state of 5 kgf was larger than 1.80 mm and the compressive deformation C of the ball when subjected to a final load of 90 kgf from an initial load of 5 kgf was larger than 2.90 mm. As a result, the initial velocity on shots was low and so the distance traveled by the ball on shots with a driver (W #1) and a number six iron (I #6) was inferior. In addition, the durability to repeated impact was poor.

In Comparative Example 5, the hardness difference expressed as "core surface hardness–core center hardness" (Cs–Cc) has a value on the Shore C hardness scale of less than 20. As a result, the spin rate on shots with a I #6 was high, and so the distance is poor.

In Comparative Example 6, the hardness difference expressed as "(core surface hardness)–(hardness at position 3 mm from core surface)," or (Cs–Cs–3), has a value on the Shore C hardness scale of more than 5.0. As a result, the durability to repeated impact is poor.

Japanese Patent Application No. 2020-017043 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core and a cover, wherein the ball has a compressive deformation B when subjected to a final load of 50 kgf from an initial load state of 5 kgf that is from 1.30 to 1.80 mm and a compressive deformation C when subjected to a final load of 90 kgf from an initial load state of 5 kgf that is from 2.45 to 2.90 mm, and the core has a hardness profile that satisfies the following conditions:

$$Cs-Cc \geq 20 \qquad (1)$$

$$Cs-Cs-3 \leq 5.0, \qquad (2)$$

wherein Cs is the Shore C hardness at a surface of the core, Cs–3 is the Shore C hardness at a position 3 mm inside the core surface and Cc is the Shore C hardness at a center of the core, and wherein the core is formed of a rubber composition comprising components (a) to (d) below:
(a) a base rubber,
(b) a co-crosslinking agent which is an α,β-unsaturated carboxylic acid or a metal salt thereof or both,
(c) a crosslinking initiator, and
(d) a lower alcohol having a molecular weight below 200.

2. The golf ball of claim 1, wherein the compressive deformation A of the ball when subjected to a final load of 5 kgf from an initial load state of 0.2 kgf is 0.18 mm or less.

3. The golf ball of claim 1, wherein the compressive deformation D of the ball when subjected to a final load of 130 kgf from an initial load state of 10 kgf is from 3.10 to 3.80 mm.

4. The golf ball of claim 1, wherein the compressive deformation E of the ball when subjected to a final load of 30 kgf from an initial load state of 5 kgf is from 0.68 to 1.05 mm.

5. The golf ball of claim 3, wherein the ratio D/A between compressive deformation D and compressive deformation A is at least 18.0.

6. The golf ball of claim 3, wherein the ratio DB between compressive deformation D and compressive deformation B is from 2.02 to 2.40.

7. The golf ball of claim 3, wherein the ratio D/C between compressive deformation D and compressive deformation C is from 1.20 to 1.31.

8. The golf ball of claim 4, wherein the ratio D/E between compressive deformation D and compressive deformation E is from 3.50 to 4.10.

9. The golf ball of claim 1, wherein component (d) is included in an amount of from 0.5 to 5 parts by weight per 100 parts by weight of the base rubber (a).

10. The golf ball of claim 1, wherein component (d) is a monohydric, dihydric or trihydric alcohol.

11. The golf ball of claim 1, wherein component (d) is butanol, glycerol, ethylene glycol or propylene glycol.

12. The golf ball of claim 1, wherein the ball further comprises, between the core and the cover, at least an intermediate layer, which golf ball has a construction of three or more layers that includes the core, the intermediate layer and the cover.

* * * * *